(12) United States Patent  
Zhang et al.

(10) Patent No.: US 12,194,875 B2  
(45) Date of Patent: Jan. 14, 2025

(54) CHARGING MODULE AND CHARGING SYSTEM

(71) Applicant: Huawei Digital Power Technologies Co., Ltd., Guangdong (CN)

(72) Inventors: Yanzhong Zhang, Shanghai (CN); Xiaofeng Yao, Shenzhen (CN); Haibin Hu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 24 days.

(21) Appl. No.: 18/168,529

(22) Filed: Feb. 13, 2023

(65) Prior Publication Data
US 2023/0391218 A1 Dec. 7, 2023

Related U.S. Application Data

(63) Continuation of application No. PCT/CN2020/119596, filed on Sep. 30, 2020.

(51) Int. Cl.
*B60L 53/51* (2019.01)
*B60L 53/10* (2019.01)
(Continued)

(52) U.S. Cl.
CPC ............ *B60L 53/51* (2019.02); *B60L 53/11* (2019.02); *B60L 53/53* (2019.02); *H02J 3/38* (2013.01); *H02J 7/00712* (2020.01); *H02J 7/35* (2013.01); *B60L 2210/14* (2013.01); *B60L 2210/40* (2013.01); *H02J 2207/20* (2020.01);
(Continued)

(58) Field of Classification Search
CPC ..... Y02T 10/7072; Y02T 90/12; Y02T 10/72; B60L 53/51; B60L 53/52; B60L 53/53; B60L 53/55; B60L 53/11
See application file for complete search history.

(56) References Cited

U.S. PATENT DOCUMENTS

2012/0249065 A1* 10/2012 Bissonette ............ B60L 53/665
320/109
2012/0310438 A1 12/2012 Kaiser
2017/0163058 A1* 6/2017 Baumgärtner .......... H02J 3/322

FOREIGN PATENT DOCUMENTS

CN 104348245 B 2/2017
CN 106786769 A 5/2017
(Continued)

*Primary Examiner* — Ryan Johnson

(57) ABSTRACT

This application provides a charging module and a charging system. The charging system includes a charging module. The charging module includes a direct current-to-direct current (DC/DC) charging component, a functional interface, an inverter, and a control and guide component. The functional interface includes a photovoltaic interface. The DC/DC charging component is configured to receive a first power exported by a photovoltaic module to charge an electric vehicle (EV). In this way, after receiving, through the photovoltaic interface, electrical energy converted from solar energy, the charging module does not need to cooperate with an on-board charger (OBC), but uses the DC/DC charging component to charge the EV with a direct current. The charging module provided in this application is not limited by a charging power of the OBC when charging the EV, thereby increasing an actual power for charging the EV and a charging speed.

5 Claims, 10 Drawing Sheets

(51) Int. Cl.
*B60L 53/53* (2019.01)
*H02J 3/38* (2006.01)
*H02J 7/00* (2006.01)
*H02J 7/35* (2006.01)

(52) U.S. Cl.
CPC ....... *H02J 2300/24* (2020.01); *Y02T 10/7072* (2013.01); *Y02T 90/12* (2013.01)

(56) References Cited

FOREIGN PATENT DOCUMENTS

| | | | |
|---|---|---|---|
| CN | 207098629 U | | 3/2018 |
| CN | 108944554 A | | 12/2018 |
| CN | 111231728 A | | 6/2020 |
| CN | 111541288 A | | 8/2020 |
| EP | 2784900 A1 | | 10/2014 |
| JP | 2010041819 A | * | 2/2010 |
| JP | 2019118247 A | * | 7/2019 |
| WO | WO-2014068733 A1 | * | 5/2014 ............. B60L 50/16 |

* cited by examiner

CHARGING MODULE AND CHARGING SYSTEM

CROSS-REFERENCE TO RELATED APPLICATIONS

This application is a continuation of International Application No. PCT/CN2020/119596, filed on Sep. 30, 2020, the disclosure of which is hereby incorporated by reference in its entirety.

TECHNICAL FIELD

Embodiments of this application relate to the field of circuits, and in particular, to a charging module and a charging system.

BACKGROUND

With the development of new energy technologies, there are an increasing number of households installed with photovoltaic power stations. A photovoltaic array is set up in space on a rooftop of a house. The photovoltaic array converts solar energy into electrical energy, which can be used to supply power to a load in the house, and can also be used to charge an electronic device in the house.

As electric vehicles (EVs) become popular, an increasing number of households buy EVs. A household with an EV often installs a charging pile in a garage to charge the EV. A battery used by a current EV requires a relatively large amount of power, and it takes a long time to fully charge the battery, causing high charging costs. To reduce the charging time and charging costs, the existing charging pile may use electrical energy converted from solar energy to charge the EV at a high power by using an on-board charger (OBC).

The existing charging pile may use electrical energy converted from solar energy to charge the EV at a high power, thereby increasing an output power of the charging pile. However, the charging pile needs to cooperate with the OBC to charge the EV, a power upper limit of the OBC is not increased, and the charging pile is limited by the power upper limit of the OBC during charging. Therefore, in an actual charging process, an actual power for charging the EV is relatively low, and a charging speed is slow.

SUMMARY

This application provides a charging module and a charging system. The charging system includes the charging module. After receiving, through a photovoltaic interface, electrical energy converted from solar energy, the charging module does not need to cooperate with an OBC, but uses a direct current-to-direct current (DC/DC) charging component to charge an EV with a direct current. The charging module provided in this application is not limited by a charging power of the OBC when charging the EV, thereby increasing an actual power for charging the EV and a charging speed.

A first aspect of this application provides a charging module, including a DC/DC charging component, a functional interface, an inverter, and a control and guide component, where the functional interface includes a photovoltaic interface; the DC/DC charging component is electrically connected to a photovoltaic module through the photovoltaic interface; a first terminal of the inverter is electrically connected to the photovoltaic module and the DC/DC charging component; the control and guide component is electrically connected to the DC/DC charging component; the control and guide component is configured to determine that the charging module is successfully connected to an EV; and the DC/DC charging component is configured to receive a first power output by the photovoltaic module to charge the EV.

This application provides a charging module. The charging module includes a DC/DC charging component, a functional interface, an inverter, and a control and guide component. The functional interface includes a photovoltaic interface. The DC/DC charging component is configured to receive a first power exported by a photovoltaic module to charge an EV. In this way, after receiving, through the photovoltaic interface, electrical energy converted from solar energy, the DC/DC charging component does not need to cooperate with an OBC, but directly charges the EV with a direct current. The charging module provided in this application is not limited by a charging power of the OBC when charging the EV, thereby increasing an actual power for charging the EV and a charging speed.

In a possible implementation of the first aspect, the first terminal of the inverter is electrically connected to the photovoltaic module, an energy storage module, and the DC/DC charging component; the inverter is configured to control the energy storage module to output a second power if determining that a charging power of the DC/DC charging component that receives the first power does not reach a target power; and the DC/DC charging component is configured to receive the first power and the second power to charge the EV.

In this possible implementation, the photovoltaic module is a solar power generation device commonly used in a household. The photovoltaic module converts solar energy into electrical energy, and inputs the first power to the charging module through the photovoltaic interface. After receiving the first power, the charging module uses the DC/DC charging component to output a direct current to the EV, so as to charge the EV. If the inverter determines that the power at which the DC/DC charging component charges the EV is less than the target power, the inverter controls the energy storage module to output the second power to the DC/DC charging component in the charging module, and the DC/DC charging component receives the first power and the second power to charge the EV. The charging module charges the EV with electrical energy converted from solar energy in the photovoltaic module and electrical energy stored in the energy storage module, thereby improving efficiency of the charging module in charging the EV while protecting the environment, and reducing a charging time of the EV.

In a possible implementation of the first aspect, the functional interface further includes a home grid interface; a second terminal of the inverter is electrically connected to a home grid through the home grid interface; the inverter is configured to control the inverter to export a third power if determining that the charging power of the DC/DC charging component that receives the first power and the second power does not reach the target power; and the DC/DC charging component is configured to receive the first power, the second power, and the third power to charge the EV.

In this possible implementation, the photovoltaic module is a solar power generation device commonly used in a household. The photovoltaic module converts solar energy into electrical energy, and inputs the first power to the charging module through the photovoltaic interface. The energy storage module outputs the second power to the DC/DC charging component in the charging module, and the DC/DC charging component receives the first power and the second power to charge the EV. If the inverter determines that the charging power of the DC/DC charging component that receives the first power and the second power does not reach the target power, the inverter is controlled to export the third power after receiving a power of the home grid through the home grid interface. The DC/DC charging component receives the first power, the second power, and the third power to charge the EV. The charging module charges the EV with electrical energy converted from solar energy in the photovoltaic module, electrical energy stored in the energy storage module, and electrical energy provided by the home grid, thereby maximizing efficiency of the charging module in charging the EV, and reducing a charging time of the EV.

In a possible implementation of the first aspect, the functional interface further includes a home grid interface; the first terminal of the inverter is electrically connected to the photovoltaic module and the DC/DC charging component, and a second terminal of the inverter is electrically connected to a home grid through the home grid interface; the inverter is configured to control the inverter to export a third power if determining that a charging power of the DC/DC charging component that receives the first power does not reach a target power; and the DC/DC charging component is configured to receive the first power and the third power to charge the EV.

In this possible implementation, the DC/DC charging component receives the first power and the third power to charge the EV. The charging module charges the EV with electrical energy converted from solar energy in the photovoltaic module and electrical energy provided by the home grid, thereby improving efficiency of the charging module in charging the EV, and reducing a charging time of the EV.

A second aspect of this application provides a charging system. The charging system includes a photovoltaic module and a charging module, where the photovoltaic module includes a photovoltaic component and a DC/DC boost component, and the charging module includes a DC/DC charging component, an inverter, and a control and guide component; a first terminal of the DC/DC boost component is electrically connected to the photovoltaic component, and a second terminal of the DC/DC boost component is electrically connected to the DC/DC charging component and a first terminal of the inverter; the first terminal of the inverter is electrically connected to the DC/DC charging component; the control and guide component is electrically connected to the DC/DC charging component; the control and guide component is configured to determine that the charging module is successfully connected to an EV; and the DC/DC charging component is configured to receive a first power exported by the DC/DC boost component to charge the EV.

In this application, the charging module included in the charging system includes the DC/DC charging component, the inverter, and the control and guide component. The DC/DC charging component is configured to receive the first power exported by the photovoltaic module to charge the EV. In this way, after receiving, through the photovoltaic interface, electrical energy converted from solar energy, the charging module does not need to cooperate with an OBC, but uses the DC/DC charging component to charge the EV with a direct current. The charging system provided in this application is not limited by a charging power of the OBC when charging the EV, thereby increasing an actual power for charging the EV and a charging speed.

In a possible implementation of the second aspect, the charging system further includes an energy storage module; the first terminal of the inverter is electrically connected to the second terminal of the DC/DC boost component, the energy storage module, and the DC/DC charging component; the energy storage module is electrically connected to the second terminal of the DC/DC boost component, the first terminal of the inverter, and a first terminal of the DC/DC charging component; the inverter is configured to control the energy storage module to output a second power if determining that a charging power of the DC/DC charging component that receives the first power does not reach a target power; and the DC/DC charging component is configured to receive the first power and the second power to charge the EV.

In this possible implementation, the photovoltaic component converts solar energy into electrical energy, and outputs the electrical energy to the DC/DC boost component. The DC/DC boost component receives the electrical energy input by one or more photovoltaic components. The DC/DC boost component performs voltage regulation on the received electrical energy, and imports the electrical energy after the voltage regulation to the DC/DC charging component. That is, the photovoltaic module inputs the first power to the DC/DC charging component. The DC/DC charging component receives the first power to charge the EV. If the inverter determines that the power at which the DC/DC charging component charges the EV is less than the target power, the inverter controls the energy storage module to output the second power to the DC/DC charging component, and the DC/DC charging component receives the first power and the second power to charge the EV. The charging system charges the EV with electrical energy converted from solar energy in the photovoltaic module and electrical energy stored in the energy storage module, thereby improving efficiency of the charging module in charging the EV while protecting the environment, and reducing a charging time of the EV.

In a possible implementation of the second aspect, a second terminal of the inverter is electrically connected to a home grid; the inverter is configured to control the inverter to export a third power if determining that the charging power of the DC/DC charging component that receives the first power and the second power does not reach the target power; and the DC/DC charging component is configured to receive the first power, the second power, and the third power to charge the EV.

In this possible implementation, the photovoltaic component converts solar energy into electrical energy, and outputs the electrical energy to the DC/DC boost component. The DC/DC boost component receives the electrical energy input by one or more photovoltaic components. The DC/DC boost component performs voltage regulation on the received electrical energy, and imports the electrical energy after the voltage regulation to the DC/DC charging component. That is, the photovoltaic module inputs the first power to the DC/DC charging component. The energy storage module outputs the second power to the DC/DC charging component, and the DC/DC charging component receives the first power and the second power to charge the EV. If the inverter determines that the power at which the DC/DC charging component charges the EV does not reach the target power, the inverter is controlled to export the third power after receiving a power of the home grid. The DC/DC charging component receives the first power, the second power, and the third power to charge the EV. The charging system charges the EV with electrical energy converted from solar energy in the photovoltaic module, electrical energy stored in the energy storage module, and electrical energy provided by the home grid, thereby maximizing efficiency of the charging module in charging the EV, and reducing a charging time of the EV.

In a possible implementation of the second aspect, the first terminal of the inverter is electrically connected to the second terminal of the DC/DC boost component and the DC/DC charging component, and a second terminal of the inverter is electrically connected to the home grid; the inverter is configured to control the inverter to export a third power if determining that a charging power of the DC/DC charging component that receives the first power does not reach a target power; and the DC/DC charging component is configured to receive the first power and the third power to charge the EV.

In this possible implementation, the DC/DC charging component receives the first power and the third power to charge the EV. The charging system charges the EV with electrical energy converted from solar energy in the photovoltaic module and electrical energy provided by the home grid, thereby improving efficiency of the charging module in charging the EV, and reducing a charging time of the EV.

In a possible implementation of the second aspect, the photovoltaic module further includes an optimizer; and a first terminal of the optimizer is electrically connected to the photovoltaic component, and a second terminal of the optimizer is electrically connected to the first terminal of the DC/DC boost component.

In this possible implementation, the optimizer can monitor and optimize electrical energy of each photovoltaic component. When a mismatch occurs in one photovoltaic component of a photovoltaic array including a plurality of photovoltaic components, the optimizer may make other photovoltaic components cooperate with each other to output an original power before the mismatch, thereby preventing a decrease in an output power of the photovoltaic module due to the mismatch of the photovoltaic component.

In a possible implementation of the second aspect, the charging module further includes an electricity meter; and a first terminal of the electricity meter is electrically connected to the second terminal of the inverter, and a second terminal of the electricity meter is electrically connected to the home grid.

In this possible implementation, the inverter can learn, from the electricity meter, an amount of electricity output by the home grid when the EV is charged, so that the charging system can more properly control an output power of the inverter, and properly control charging costs.

In a possible implementation of the second aspect, the DC/DC boost component has one input or a plurality of inputs.

In a possible implementation of the second aspect, the inverter, the energy storage module, and the DC/DC charging component communicate with one another through direct current power-line communication (DC PLC); the inverter, the energy storage module, and the DC/DC charging component communicate with one another through RS485; or the inverter, the energy storage module, and the DC/DC charging component communicate with one another through a CAN.

DETAILED DESCRIPTION OF EMBODIMENTS

The following clearly and completely describes the technical solutions in embodiments of the present disclosure with reference to the accompanying drawings in embodiments of the present disclosure. It is clear that, the described embodiments are merely a part rather than all of embodiments of the present disclosure. All other embodiments obtained by a person skilled in the art based on embodiments of the present disclosure shall fall within the protection scope of the present disclosure.

In the specification, claims, and accompanying drawings of the present disclosure, terms "first", "second", "third", "fourth", and so on (if existent) are intended to distinguish between similar objects but do not necessarily indicate a specific order or sequence. It should be understood that data used in such a way are interchangeable in appropriate circumstances so that embodiments described herein can be implemented in an order other than orders illustrated or described herein. Moreover, terms "include", "comprise", and any other variants mean to cover non-exclusive inclusion, for example, a process, method, system, product, or device that includes a list of steps or units is not necessarily limited to those steps or units, but may include other steps or units not expressly listed or inherent to such a process, method, product, or device.

An EV is a vehicle that uses a vehicle-mounted power supply as a power source, drives wheels by using a motor, and complies with various requirements of road transportation and safety regulations. Electric vehicles have smaller impact on the environment than conventional vehicles, and therefore are widely believed to have promising prospects.

Figure 1:
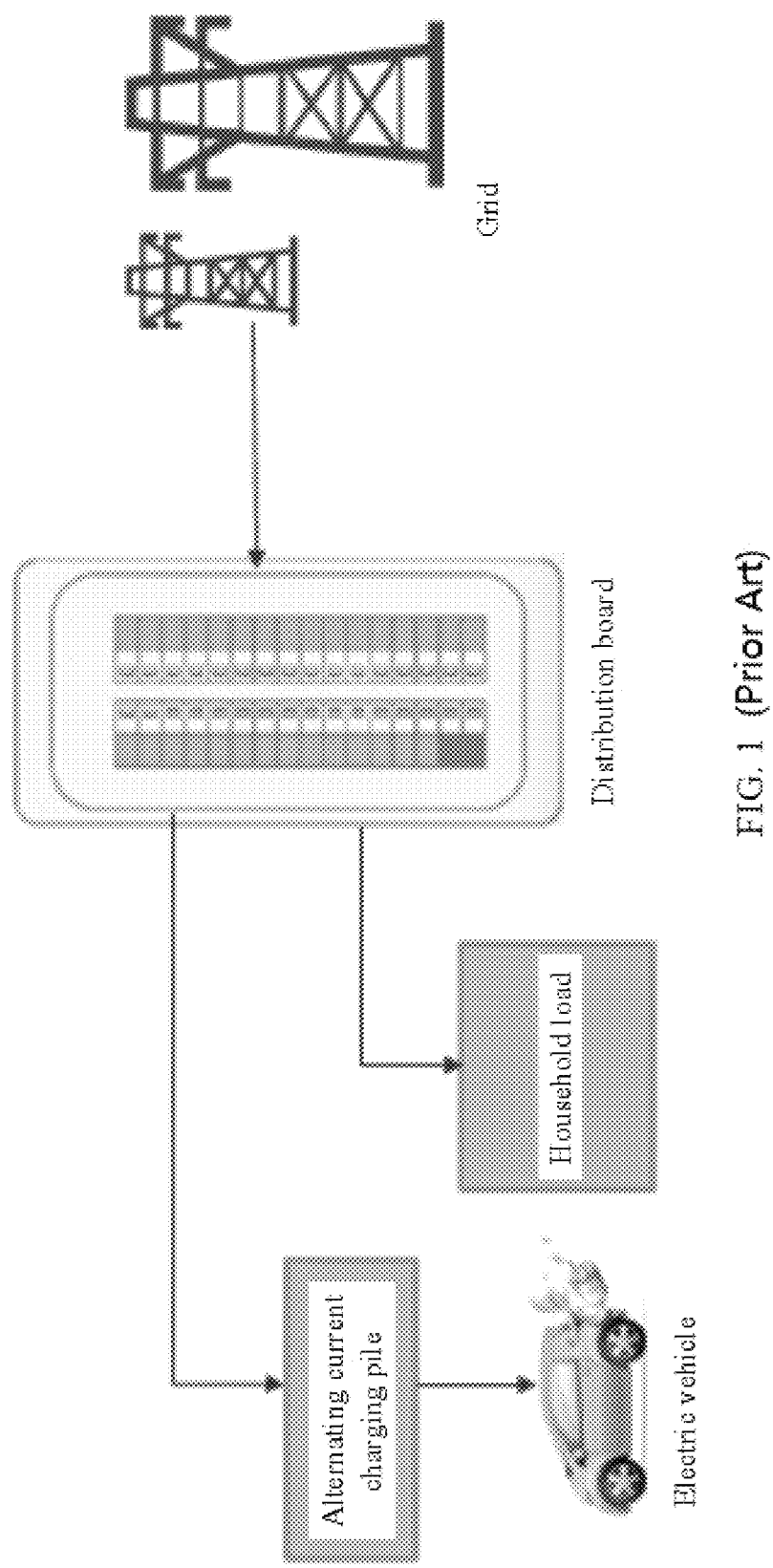
FIG. 1 is a schematic diagram of conventional charging of an EV.

FIG. 1 is a schematic diagram of conventional charging of an EV.

As shown in FIG. 1, at present, an EV is usually charged with an alternating current. A home distribution board is electrically connected to the grid. One path from the home distribution board is separately connected to an alternating current charging pile. An alternating current charging connector of the alternating current charging pile is connected to an alternating current charging socket of the EV. In this way, the alternating current charging pile can charge the EV via an OBC on the EV that matches the alternating current charging socket.

In the foregoing charging solution, when the alternating current charging pile charges the EV with electrical energy from the grid, a large amount of electrical energy is required for charging of the EV, causing high charging costs.

With the development of new energy technologies, there are an increasing number of households installed with photovoltaic power stations. A photovoltaic array is set up in space on a rooftop of a house. The photovoltaic array converts solar energy into electrical energy, which can be used to supply power to a load in the house, and can also be used to charge an electronic device in the house. After EVs become popular, an increasing number of households buy EVs. A household with an EV often installs a charging pile in a garage to charge the EV. The charging module provided in this application may be a charging pile for home use. The charging module provided in this application does not need to cooperate with an OBC, and may use electrical energy converted from solar energy to directly charge the EV with a direct current at a high power. This increases an actual power for charging the EV and a charging speed.

Optionally, the charging module provided in this application may be in the form of a charging pile, or may be in the form of a charging gun, or may be in another implementation form. This is not specifically limited herein.

Figure 2:
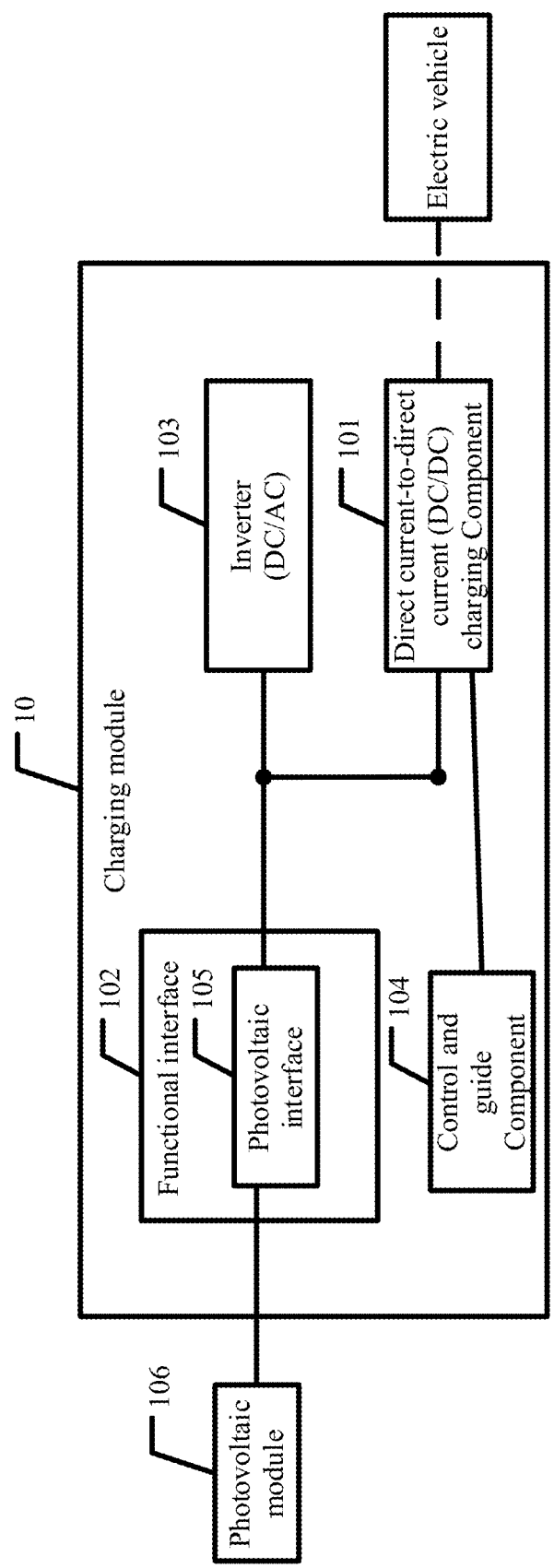
FIG. 2 is a schematic diagram of a structure of a charging module according to this application.

A plurality of implementations of the charging module provided in this application are described below in detail with reference to FIG. 2. FIG. 2 is a schematic diagram of a structure of a charging module according to this application.

Refer to FIG. 2. In this application, the charging module 10 includes a DC/DC charging component 101, a functional interface 102, an inverter 103, and a control and guide component 104. The functional interface 102 includes a photovoltaic interface 105.

The DC/DC charging component 101 is electrically connected to a photovoltaic module 106 through the photovoltaic interface 105. A first terminal of the inverter 103 is electrically connected to the photovoltaic module 106 and the DC/DC charging component 101. The control and guide component 104 is electrically connected to the DC/DC charging component 101. The control and guide component 104 is configured to determine that the charging module 10 is successfully connected to an EV. The DC/DC charging component 101 is configured to receive a first power output by the photovoltaic module 106 to charge the EV.

In this application, the control and guide component may be configured to determine whether the charging module is successfully connected to the EV. The charging module charges the EV only after the control and guide component determines that the charging module is successfully connected to the EV. In addition, data may be exchanged between the control and guide component and the EV. For example, optionally, the charging module may inform, via the control and guide component, the EV of a maximum charging power of the charging module. Optionally, the EV may inform, via the control and guide component, a charging pile of a type of a battery to be charged on the EV. Optionally, the charging module may further exchange other data with the EV via the control and guide component. This is not specifically limited herein.

In this application, the photovoltaic module 106 is a solar power generation device commonly used in a household. The photovoltaic module 106 converts solar energy into electrical energy, and inputs the first power to the charging module 10 through the photovoltaic interface 105. After receiving the first power, the charging module 10 uses the DC/DC charging component 101 to output a direct current to the EV, so as to charge the EV.

This application provides a charging module and a charging system. The charging system includes a charging module. The charging module includes a DC/DC charging component, a functional interface, an inverter, and a control and guide component. The functional interface includes a photovoltaic interface. The DC/DC charging component is configured to receive a first power exported by a photovoltaic module to charge an EV. In this way, after receiving, through the photovoltaic interface, electrical energy converted from solar energy, the charging module does not need to cooperate with an OBC, but uses the DC/DC charging component to charge the EV with a direct current. The charging module provided in this application is not limited by a charging power of the OBC when charging the EV, thereby increasing an actual power for charging the EV and a charging speed.

Figure 3:
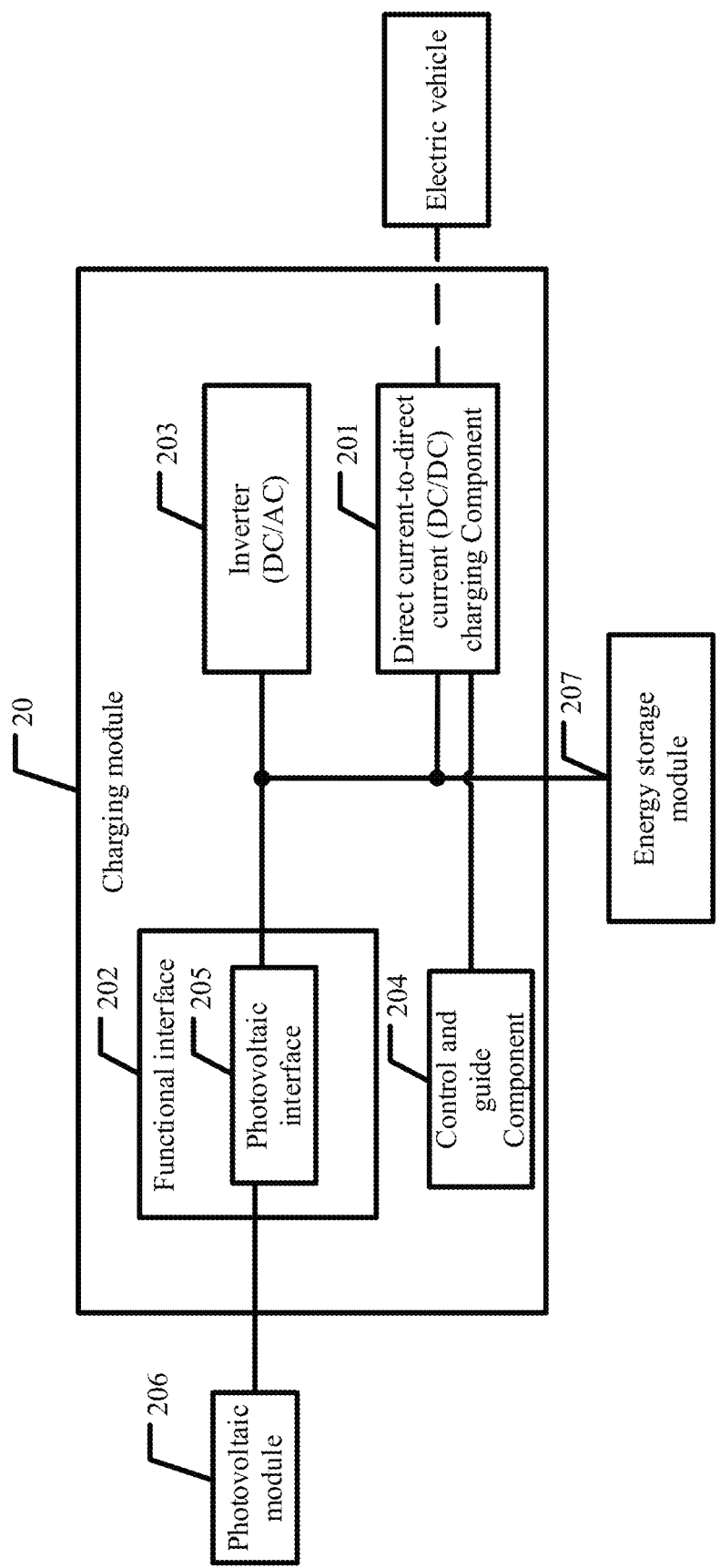
FIG. 3 is a schematic diagram of another structure of a charging module according to this application.

FIG. 3 is a schematic diagram of another structure of a charging module according to this application.

Refer to FIG. 3. In this application, similar to FIG. 2, the charging module 20 provided in this embodiment of this application includes a DC/DC charging component 201, a functional interface 202, an inverter 203, and a control and guide component 204. The functional interface 202 includes a photovoltaic interface 205.

A first terminal of the inverter 203 is electrically connected to a photovoltaic module 206, the DC/DC charging component 201, and an energy storage module 207.

The inverter 203 is configured to control the energy storage module 207 to output a second power if determining that a charging power of the DC/DC charging component 201 that receives a first power does not reach a target power.

The DC/DC charging component 201 is configured to receive the first power and the second power to charge an EV.

In this application, the photovoltaic module 206 is a solar power generation device commonly used in a household. The photovoltaic module 206 converts solar energy into electrical energy, and inputs the first power to the charging module 20 through the photovoltaic interface 205. After receiving the first power, the charging module 20 uses the DC/DC charging component 201 to output a direct current to the EV, so as to charge the EV. If the inverter 203 determines that the power at which the DC/DC charging component 201 charges the EV is less than the target power, the inverter 203 controls the energy storage module 207 to output the second power to the DC/DC charging component 201 in the charging module 20, and the DC/DC charging component 201 receives the first power and the second power to charge the EV. The charging module charges the EV with electrical energy converted from solar energy and electrical energy stored in the energy storage module, thereby improving efficiency of the charging module in charging the EV while protecting the environment, and reducing a charging time of the EV.

Figure 4:
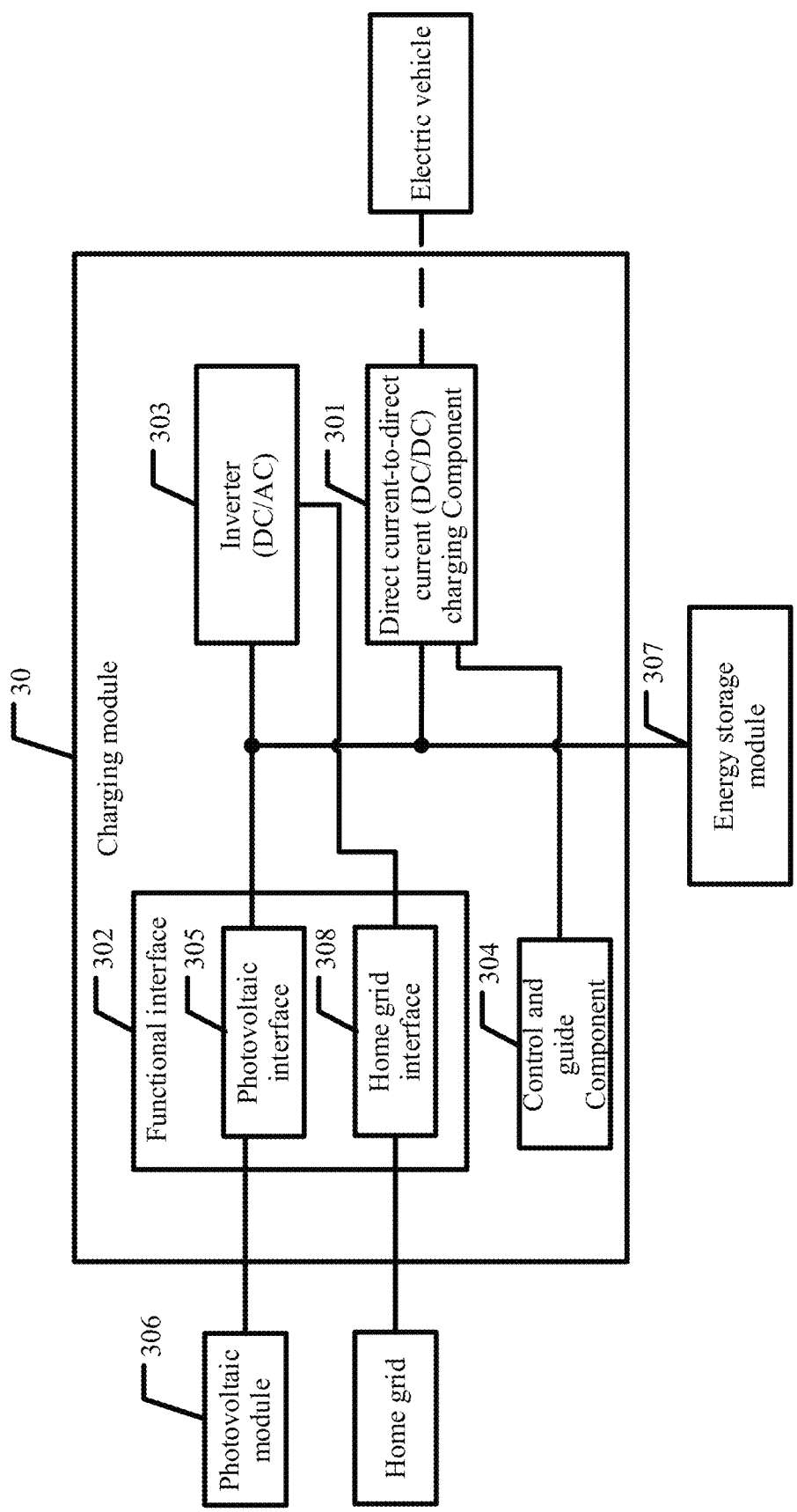
FIG. 4 is a schematic diagram of another structure of a charging module according to this application.

FIG. 4 is a schematic diagram of another structure of a charging module according to this application.

Refer to FIG. 4. In this application, similar to FIG. 3, the charging module 30 is electrically connected to a photovoltaic module 306 and an energy storage module 307, and the charging module includes a DC/DC charging component 301, a functional interface 302, an inverter 303, and a control and guide component 304. Optionally, in addition to a photovoltaic interface 305, the functional interface 302 further includes a home grid interface 308.

A second terminal of the inverter 303 is electrically connected to a home grid through the home grid interface 308.

The inverter 303 is configured to control the inverter 303 to export a third power if determining that a charging power of the DC/DC charging component 301 that receives a first power and a second power does not reach a target power.

The DC/DC charging component 301 is configured to receive the first power, the second power, and the third power to charge an EV.

In this application, the photovoltaic module 306 is a solar power generation device commonly used in a household. The photovoltaic module 306 converts solar energy into electrical energy, and inputs the first power to the charging module 30 through the photovoltaic interface 305. The energy storage module 307 outputs the second power to the DC/DC charging component 301 in the charging module 30, and the DC/DC charging component 301 receives the first power and the second power to charge the EV. If the inverter 303 determines that the charging power of the DC/DC charging component 301 that receives the first power and the second power does not reach the target power, the inverter 303 is controlled to export the third power after receiving a power of the home grid through the home grid interface 308. The DC/DC charging component 301 receives the first power, the second power, and the third power to charge the EV. The charging module charges the EV with electrical energy converted from solar energy in the photovoltaic module, electrical energy stored in the energy storage module, and electrical energy provided by the home grid, thereby maximizing efficiency of the charging module in charging the EV, and reducing a charging time of the EV.

In embodiments of this application, when the charging module charges the EV, there are a plurality of different charging scenarios. The plurality of different charging scenarios are specifically described in the following embodiments.

Scenario 1: The charging module charges the EV in a green charging mode.

In an embodiment of this application, if the charging module charges the EV in the green mode, the charging module charges the EV only with electrical energy provided by the photovoltaic assembly.

Figure 5:
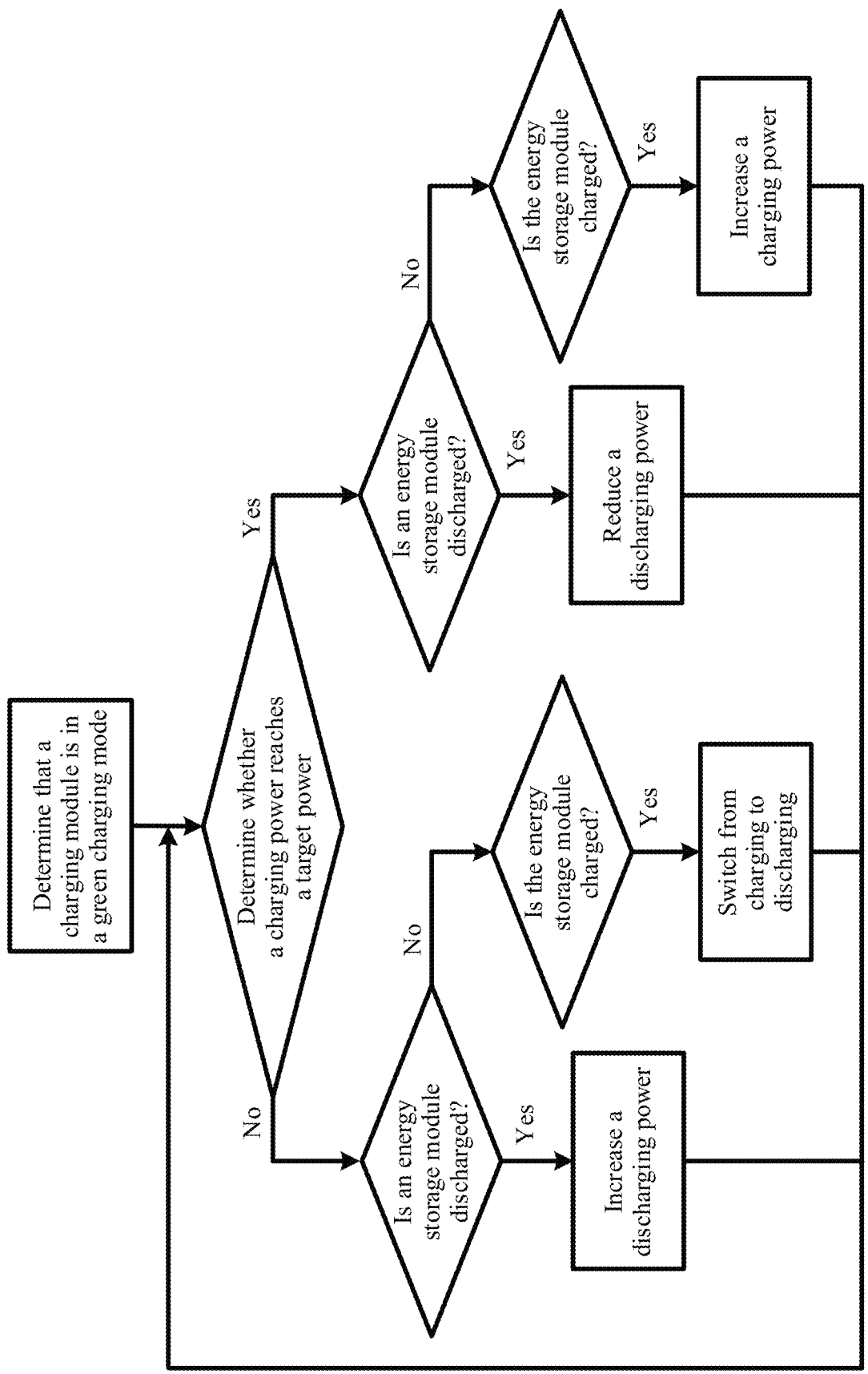
FIG. 5 is a schematic diagram of an embodiment of charging an EV by a charging module according to this application.

FIG. 5 is a schematic diagram of an embodiment of charging an EV by a charging module according to this application.

As shown in FIG. 5, after the charging module starts charging the EV (that is, after a DC/DC charging component receives a first power to charge the EV), when an inverter determines that a power at which the charging module charges the EV is less than a target power, the inverter determines whether an energy storage module included in a photovoltaic module is discharged (that is, the inverter determines whether the energy storage module outputs a second power). If the inverter determines that the energy storage module is discharged, the inverter controls the energy storage module to increase a discharging power (that is, the inverter controls the energy storage module to increase the output second power), so that the power at which the DC/DC charging component charges the EV after receiving the first power and the second power is higher than the target power. If the inverter determines that the energy storage module is not discharged (that is, the energy storage module does not output the second power), the inverter determines whether the energy storage module is charged. If the inverter determines that the energy storage module is in a charging state, the inverter controls the energy storage module to reduce a charging power, so as to increase the first power output by the photovoltaic module. When the charging power is reduced to 0, the inverter controls the energy storage module to be discharged (that is, the energy storage module outputs the second power), so that the power at which the DC/DC charging component charges the EV after receiving the first power and the second power is higher than the target power.

After the charging module starts charging the EV, when the inverter determines that the power at which the charging module charges the EV is greater than the target power, the inverter determines whether the energy storage module is discharged. If the inverter determines that the energy storage module is discharged, the inverter controls the energy storage module to reduce the discharging power to save electrical energy. If the inverter determines that the energy storage module is not discharged, the inverter determines whether the energy storage module is charged. If the inverter determines that the energy storage module is in a charging state, the inverter controls the energy storage module to increase the charging power, so as to save electrical energy.

In this application, when there is sufficient solar irradiation in the daytime, the inverter may control, by monitoring electricity meter information at a grid-connected point, the photovoltaic module to charge the EV with electrical energy converted from solar energy, and then supply power to a household load. If there is additional energy, the inverter controls the photovoltaic module to charge the energy storage module to store the additional energy. When there is no insufficient irradiation in the daytime or there is no solar irradiation in the night, the inverter controls the energy storage module to be discharged to charge the EV. When the EV is fully charged, the energy storage module may be discharged to supply power to the household load.

Scenario 2: The charging module charges the EV in a fast charging mode.

In this application, if the charging module charges the EV in the fast charging mode, the charging module may charge the EV with electrical energy provided by the photovoltaic module, or the charging module may charge the EV with electrical energy provided by the photovoltaic module and the energy storage module, or the charging module may charge the EV with electrical energy provided by the photovoltaic module, the energy storage module, and the home grid.

In this application, after the charging module starts charging the EV in the fast charging mode, the inverter sets an output power of the photovoltaic module to a maximum value, and the inverter sets the energy storage module and the inverter to be in a discharging mode, and sets a discharging power of the energy storage module and the inverter to zero. If the inverter determines that the power at which the charging module charges the EV is less than the target power, the inverter increases the discharging power of the energy storage module. If the inverter determines again that the power at which the charging module charges the EV is less than the target power, the inverter controls to increase a power at which the home grid outputs electrical energy to the inverter, increase a power at which the inverter discharges electrical energy to the charging module, and increase a discharging power of the energy storage module again, until the inverter determines that the charging power of the DC/DC charging component is greater than the target power.

Figure 6:
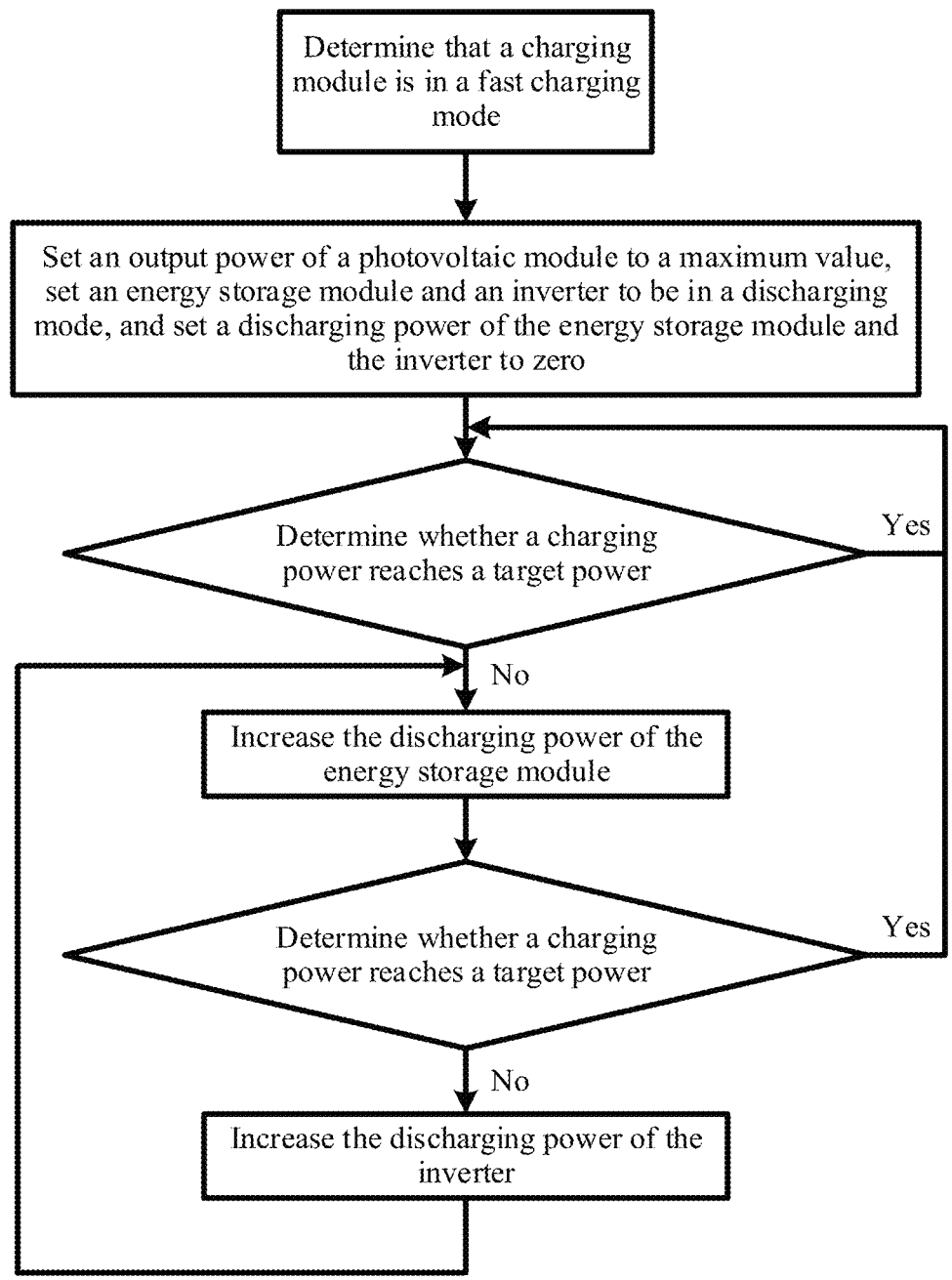
FIG. 6 is a schematic diagram of another embodiment of charging an EV by a charging module according to this application.

FIG. 6 is a schematic diagram of another embodiment of charging an EV by a charging module according to this application.

As shown in FIG. 6, when the charging module starts charging the EV in a fast charging mode, an inverter sets a charging power of solar energy charging in a photovoltaic module to a maximum value, and sets an energy storage module and the inverter to be in a discharging mode with a discharging power of zero. If the inverter determines that the power at which the charging module charges the EV is less than a target power, the inverter increases a power at which the energy storage module discharges electrical energy to the charging module. After the discharging power of the energy storage module is increased, the inverter may determine again whether the power at which the charging module charges the EV is less than the target power. If the power at which the charging module charges the EV is less than the target power, a power at which the inverter discharges electrical energy to the charging module is increased.

This application provides a charging module. The charging module includes a DC-/DC charging component and a functional interface. The functional interface includes a photovoltaic interface. The DC/DC charging component is electrically connected to a photovoltaic module through the photovoltaic interface. The DC/DC charging component is configured to receive a first power exported by a photovoltaic module to charge an EV. In this way, after receiving, through the photovoltaic interface, electrical energy converted from solar energy, the charging module does not need to cooperate with an OBC, but uses the DC/DC charging component to charge the EV with a direct current. The charging module provided in this application is not limited by a charging power of the OBC when charging the EV, thereby increasing an actual power for charging the EV and a charging speed.

The foregoing embodiments describe different implementations of the charging module provided in this application. The following describes in detail a charging system including the charging module provided in this application.

Figure 7:
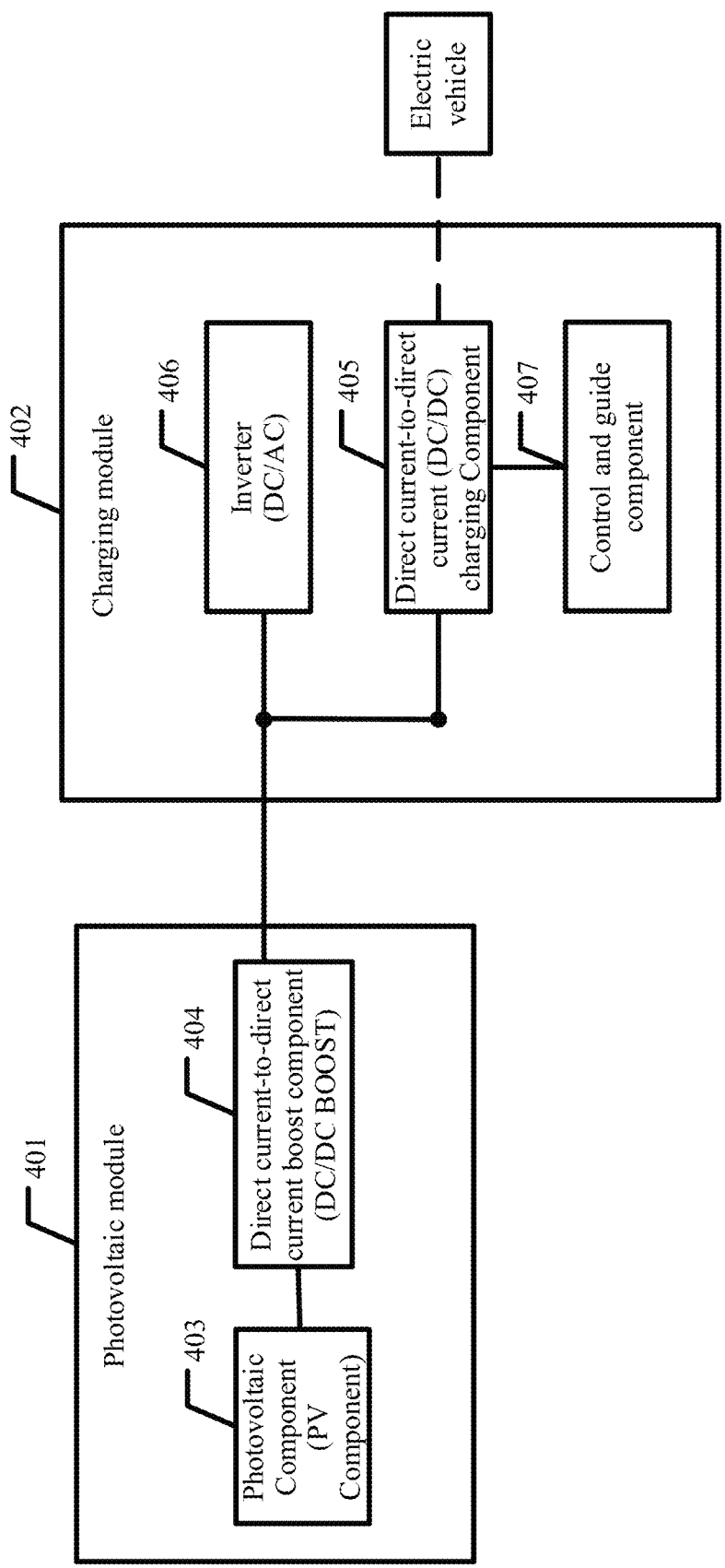
FIG. 7 is a diagram of a topology of a charging system according to this application.

FIG. 7 is a diagram of a topology of a charging system according to this application.

Refer to FIG. 7. In this application, the charging system includes a photovoltaic module 401 and a charging module 402. The photovoltaic module 401 includes a photovoltaic component 403 and a DC/DC boost component 404. The charging module 402 includes a DC/DC charging component 405, an inverter 406, and a control and guide component 407.

A first terminal of the DC/DC boost component 404 is electrically connected to the photovoltaic component 403, and a second terminal of the DC/DC boost component 404 is electrically connected to the DC/DC charging component 405 and a first terminal of the inverter 406.

The first terminal of the inverter 406 is electrically connected to the DC/DC charging component 405.

The control and guide component 407 is electrically connected to the DC/DC charging component.

The control and guide component 407 is configured to determine that the charging module 402 is successfully connected to an EV.

The DC/DC charging component 405 is configured to receive a first power exported by the DC/DC boost component 404 to charge the EV.

In this application, the photovoltaic module 401 is a solar power generation device commonly used in a household. The photovoltaic component 403 converts solar energy into electrical energy, and outputs the electrical energy to the DC/DC boost component 404. The DC/DC boost component 404 receives electrical energy input by one or more photovoltaic components 403. The DC/DC boost component 404 steps up a voltage of the received electrical energy, and imports the electrical energy after the voltage step-up to the DC/DC charging component 405 (that is, the photovoltaic module inputs the first power to the DC/DC charging component 405). The DC/DC charging component 405 receives the first power to charge the EV.

Figure 8:
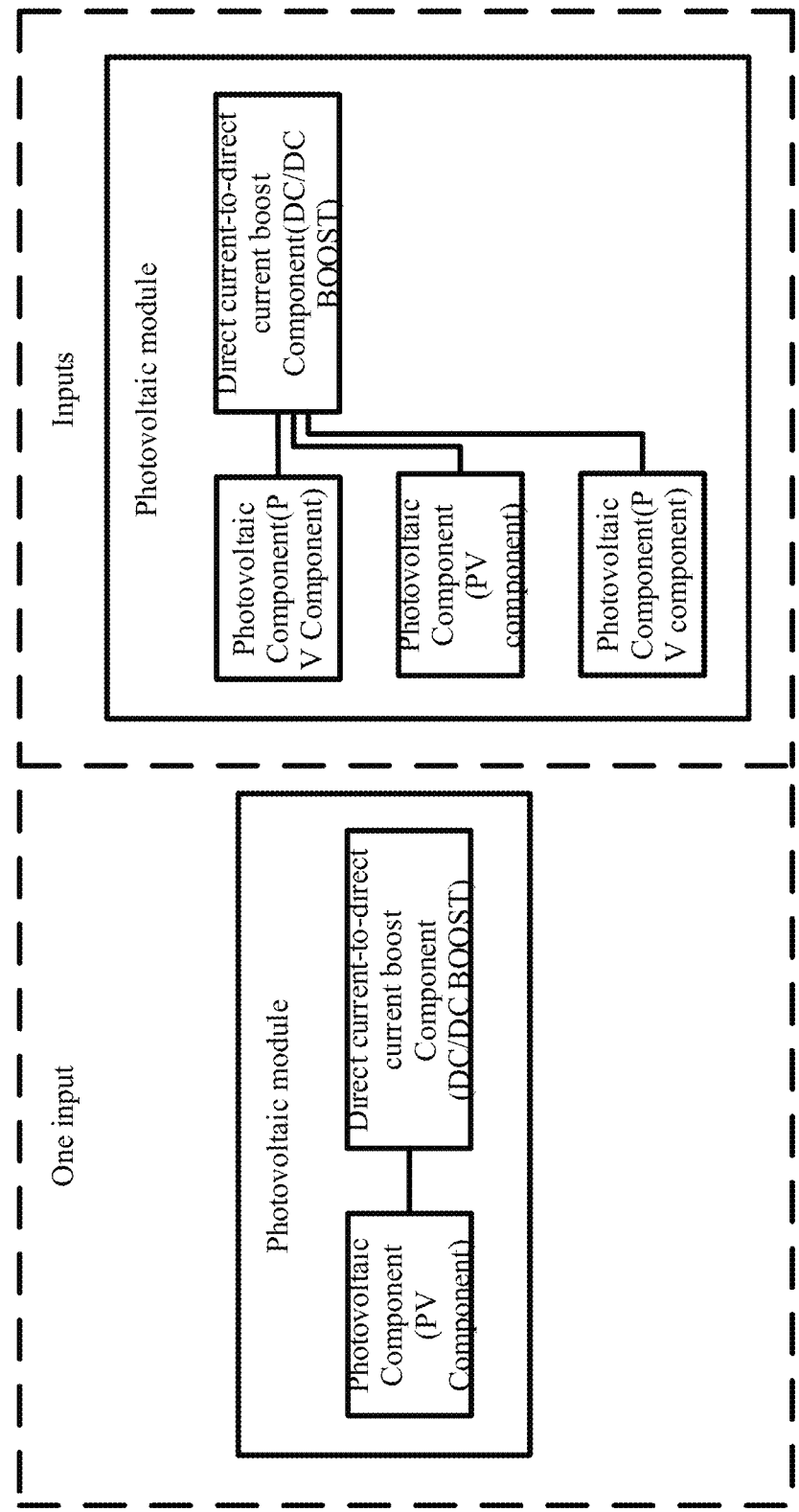
FIG. 8 is a schematic diagram of an embodiment of a charging system according to this application.

FIG. 8 is a schematic diagram of an embodiment of a charging system according to this application.

Refer to FIG. 8. In this application, optionally, a DC/DC boost component may have one input, that is, one DC/DC boost component is connected to one photovoltaic component. As such, one DC/DC boost component may receive electrical energy input by one photovoltaic component. Optionally, the DC/DC boost component may have a plurality of inputs, that is, one DC/DC boost component is connected to a plurality of photovoltaic components. As such, one DC/DC boost component may receive electrical energy input by a plurality of photovoltaic components. In the embodiment shown in FIG. 7, one input is used as an example for description. During specific implementation, the DC/DC boost component may have one input or a plurality of inputs. This is not specifically limited herein.

Figure 9:
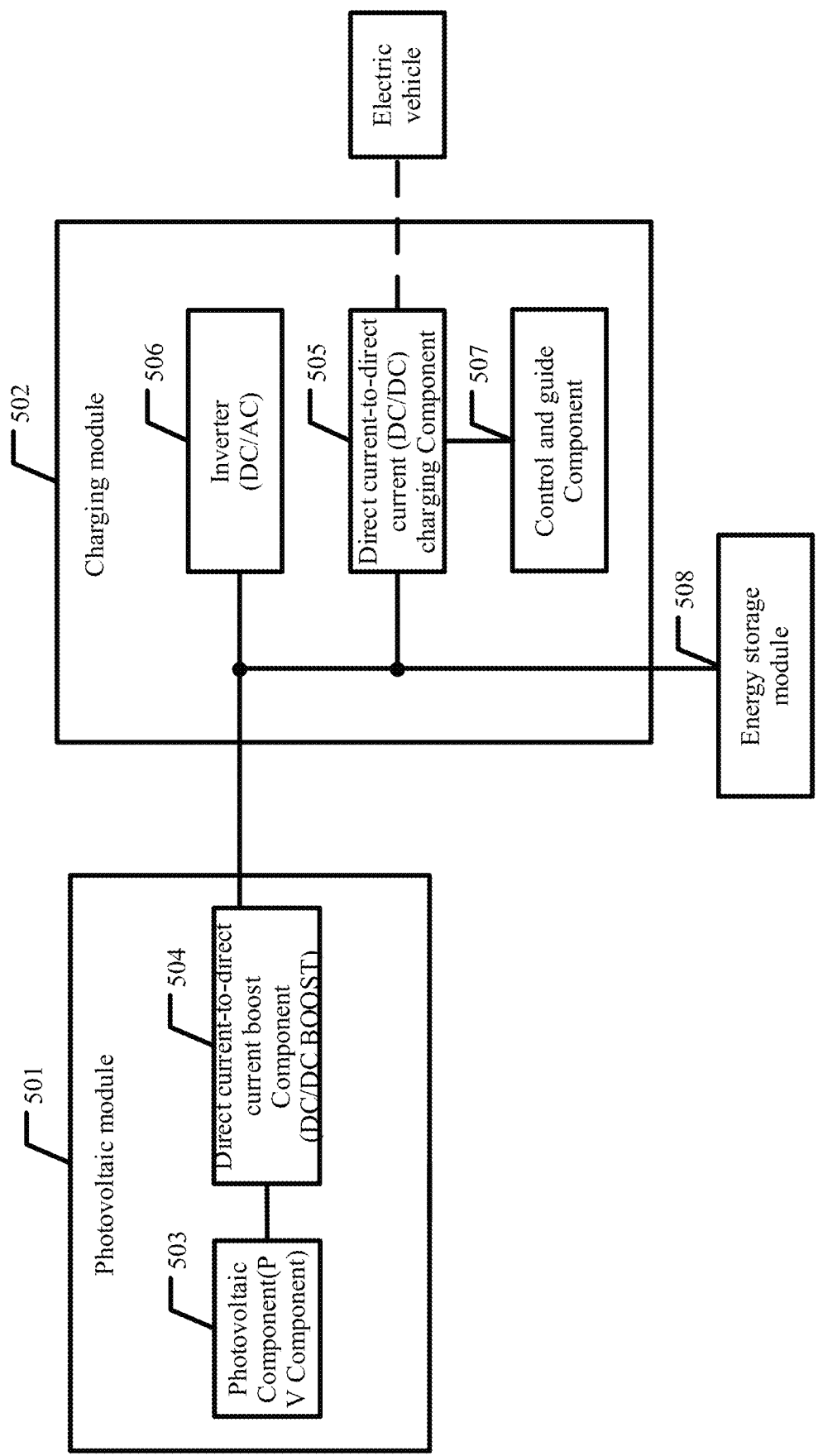
FIG. 9 is a diagram of another topology of a charging system according to this application.

FIG. 9 is a diagram of another topology of a charging system according to this application.

Refer to FIG. 9. In this application, similar to the embodiment shown in FIG. 7, the charging system includes a photovoltaic module 501 and a charging module 502. The photovoltaic module 501 includes a photovoltaic component 503 and a DC/DC boost component 504. The charging module 502 includes a DC/DC charging component 505, an inverter 506, and a control and guide component 507. Optionally, the charging system may further include an energy storage module 508.

A first terminal of the inverter 506 is electrically connected to a second terminal of the DC/DC boost component 504, the energy storage module 508, and the DC/DC charging component 505.

The energy storage module 508 is electrically connected to the second terminal of the DC/DC boost component 504, the first terminal of the inverter 506, and a first terminal of the DC/DC charging component 505.

The inverter 506 is configured to control the energy storage module 508 to output a second power if determining that a charging power of the DC/DC charging component 505 that receives a first power does not reach a target power.

The DC/DC charging component is configured to receive the first power and the second power to charge an EV.

In this application, the photovoltaic component 503 converts solar energy into electrical energy, and outputs the electrical energy to the DC/DC boost component 504. The DC/DC boost component 504 receives electrical energy input by one or more photovoltaic components 503. The DC/DC boost component 504 steps up a voltage of the received electrical energy, and imports the electrical energy after the voltage step-up to the DC/DC charging component 505 (that is, the photovoltaic module inputs the first power to the DC/DC charging component 505). The DC/DC charging component 505 receives the first power to charge the EV. If the inverter 506 determines that the power at which the DC/DC charging component 505 charges the EV is less than the target power, the inverter 506 controls the energy storage module 507 to output the second power to the DC/DC charging component 505, and the DC/DC charging component 505 receives the first power and the second power to charge the EV. The charging system charges the EV with electrical energy converted from solar energy in the photovoltaic module 501 and electrical energy stored in the energy storage module 508, thereby improving efficiency of the charging module 502 in charging the EV while protecting the environment, and reducing a charging time of the EV.

In this application, an input mode of the DC/DC boost component 504 is similar to that of the DC/DC boost component provided in the embodiment shown in FIG. 8. Details are not described herein again.

Figure 10:
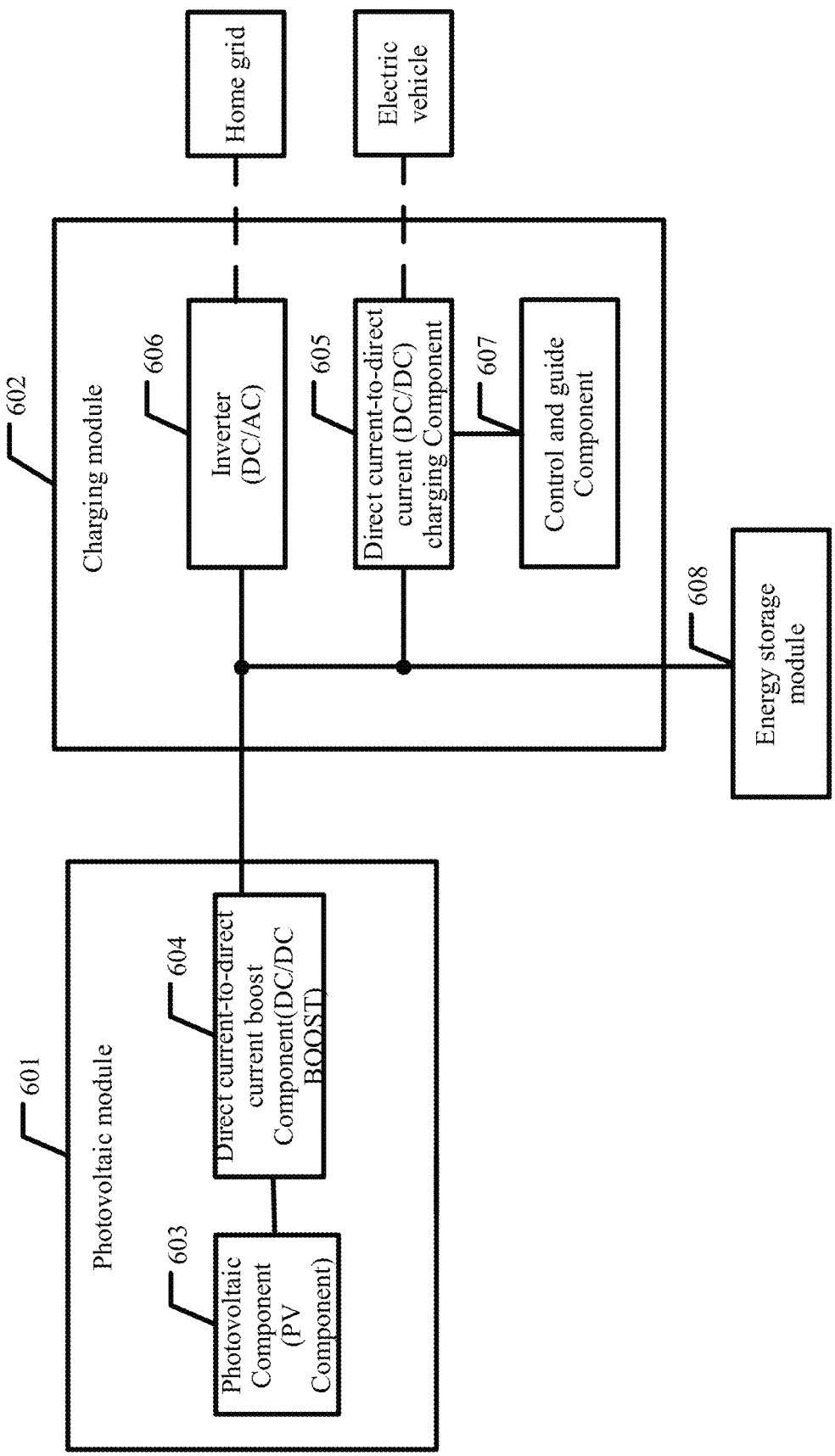
FIG. 10 is a diagram of another topology of a charging system according to this application.

FIG. 10 is a diagram of another topology of a charging system according to this application.

Refer to FIG. 10. In this application, similar to the embodiment shown in FIG. 9, the charging system includes a photovoltaic module 601, a charging module 602, and an energy storage module 608. The photovoltaic module 601 includes a photovoltaic component 603 and a DC/DC boost component 604. The charging module 602 includes a DC/DC charging component 605, an inverter 606, and a control and guide component 607.

A second terminal of the inverter 606 is electrically connected to a home grid.

The inverter 606 is configured to control the inverter 606 to export a third power if determining that a charging power of the DC/DC charging component 605 that receives a first power and a second power does not reach a target power.

The DC/DC charging component 605 is configured to receive the first power, the second power, and the third power to charge an EV.

In this application, the photovoltaic component 603 converts solar energy into electrical energy, and outputs the electrical energy to the DC/DC boost component 604. The DC/DC boost component 604 receives electrical energy input by one or more photovoltaic components 603. The DC/DC boost component 604 performs voltage regulation on the received electrical energy, and imports the electrical energy after the voltage regulation to the DC/DC charging component 605 (that is, the photovoltaic module inputs the first power to the DC/DC charging component 605). The energy storage module 607 outputs the second power to the DC/DC charging component 605, and the DC/DC charging component 605 receives the first power and the second power to charge the EV. If the inverter 606 determines that the power at which the DC/DC charging component 605 charges the EV does not reach the target power, the inverter 606 is controlled to export the third power after receiving the power of the home grid. The DC/DC charging component 605 receives the first power, the second power, and the third power to charge the EV. The charging system charges the EV with electrical energy converted from solar energy in the photovoltaic module 601, electrical energy stored in the energy storage module 608, and electrical energy provided by the home grid, thereby maximizing efficiency of the charging module 602 in charging the EV, and reducing a charging time of the EV. In this application, an input mode of the DC/DC boost component 604 is similar to that of the DC/DC boost component provided in the embodiment shown in FIG. 8. Details are not described herein again.

In this application, the charging system provided in the embodiments shown in FIG. 9 and FIG. 10 also has different implementation scenarios. The specific implementations are similar to those shown in FIG. 5 and FIG. 6. Details are not described herein again.

In this application, based on the charging system provided in the embodiments shown in FIG. 7, FIG. 9, and FIG. 10, optionally, the photovoltaic module may further include an optimizer. A first terminal of the optimizer is electrically connected to the photovoltaic component, and a second terminal of the optimizer is electrically connected to the first terminal of the DC/DC boost component.

In this application, the optimizer can monitor and optimize electrical energy of each photovoltaic component. When a mismatch occurs in one photovoltaic component of a photovoltaic array including a plurality of photovoltaic components, a decrease in an output power of the photovoltaic module due to the mismatch of the photovoltaic component can be prevented.

In this application, based on the charging system provided in the embodiment shown in FIG. 10, optionally, the charging module may further include an electricity meter. A first terminal of the electricity meter is electrically connected to the second terminal of the inverter, and a second terminal of the electricity meter is electrically connected to the home grid. The inverter can learn, from the electricity meter, an amount of electricity output by the home grid when the EV is charged, so that the charging system can more properly control an output power of the inverter, and properly control charging costs.

In this application, based on the charging system provided in the embodiments shown in FIG. 9 and FIG. 10, optionally, the inverter, the energy storage module, and the DC/DC charging component may communicate with one another through DC PLC. Optionally, the inverter, the energy storage module, and the DC/DC charging component may communicate with one another through RS485. Optionally, the inverter, the energy storage module, and the DC/DC charging component may communicate with one another through a controller area network (CAN). Optionally, the inverter, the energy storage module, and the DC/DC charging component may communicate with one another in another manner. This is not specifically limited herein.

This application provides a charging system. A charging module included in the charging system includes a DC/DC charging component. The DC/DC charging component is configured to receive a first power exported by a photovoltaic module to charge an EV. In this way, after receiving, through the photovoltaic interface, electrical energy converted from solar energy, the charging module does not need to cooperate with an OBC, but uses the DC/DC charging component to charge the EV with a direct current. The charging system provided in this application is not limited by a charging power of the OBC when charging the EV, thereby increasing an actual power for charging the EV and a charging speed.

The charging module and the charging system provided in embodiments of this application are described in detail above. Specific examples are used herein to explain the principles and implementations of this application, and the description of embodiments is only intended to facilitate an understanding of the method of this application and the core idea thereof. In addition, a person of ordinary skill in the art may make variations and modifications to this application in terms of the specific implementations and application scopes based on the ideas of this application. In conclusion, the content of this specification shall not be construed as a limitation to this application.

What is claimed is:

1. A charging module, comprising a direct current-to-direct current (DC/DC) charging component, a functional interface comprising a photovoltaic interface, an inverter, and a control and guide component, wherein
the DC/DC charging component is electrically connected to a photovoltaic module through the photovoltaic interface;
a first terminal of the inverter is electrically connected to the photovoltaic module, the DC/DC charging component and an energy storage module, a second terminal of the inverter is electrically connected to a home grid through a home grid interface;

the control and guide component is electrically connected to the DC/DC charging component and configured to determine that the charging module is successfully connected to an electric vehicle (EV);

the DC/DC charging component is configured to receive a first power output by the photovoltaic module to charge the EV, the inverter, the energy storage module, and the DC/DC charging component communicate with one another through DC power-line communication (DC PLC), RS485 or a controller area network (CAN), and the inverter is configured to control the inverter, and the energy storage module to output one or more powers to the DC/DC charging component to charge the EV wherein if the inverter determines that a charging power of the DC/DC charging component that receives the first power does not reach a target power, the inverter is configured to control the energy storage module to output a second power to the DC/DC charging component, and the DC/DC charging component is configured to charge the EV using the first power from the photovoltaic module and the second power from the energy storage module and if the inverter determines that a charging power of the DC/DC charging component that receives the first power and the second power does not reach the target power, the inverter is configured to control the inverter to output a third power to the DC/DC charging component, and the DC/DC charging component is configured to charge the EV using the first power, the second power and the third power, the third power is from the home grid.

2. A charging system, comprising a photovoltaic module and a charging module and an energy storage module, wherein the photovoltaic module comprises a photovoltaic component and a direct current-to-direct current (DC/DC) boost component, and the charging module comprises a DC/DC charging component, an inverter, and a control and guide component;

a first terminal of the DC/DC boost component is electrically connected to the photovoltaic module, and a second terminal of the DC/DC boost component is electrically connected to the DC/DC charging component and a first terminal of the inverter;

the first terminal of the inverter is electrically connected to the DC/DC charging component, the energy storage module, and the second terminal of the DC/DC boost component, and a second terminal of the inverter is electrically connected to a home grid;

the control and guide component is electrically connected to the DC/DC charging component and configured to determine that the charging module is successfully connected to an electric vehicle (EV);

the DC/DC charging component is configured to receive a first power output by the DC/DC boost component to charge the EV;

the inverter, the energy storage module, and the DC/DC charging component communicate with one another through DC power-line communication (DC PLC), RS485 or a controller area network (CAN), and the inverter is configured to control the inverter, and the energy storage module to output one or more powers to the DC/DC charging component to charge the EV; wherein if the inverter determines that a charging power of the DC/DC charging component that receives the first power does not reach a target power, the inverter is configured to control the energy storage module to output a second power to the DC/DC charging component, and the DC/DC charging component is configured to charge the EV using the first power from the photovoltaic module and the second power from the energy storage; and if the inverter determines that a charging power of the DC/DC charging component that receives the first power and the second power does not reach the target power, the inverter is configured to control the inverter to output a third power to the DC/DC charging component, and the DC/DC charging component is configured to charge the EV using the first power, the second power and the third power, the third power is from the home grid.

3. The charging system according to claim 2, wherein the photovoltaic module further comprises an optimizer; and a first terminal of the optimizer is electrically connected to the photovoltaic component, and a second terminal of the optimizer is electrically connected to the first terminal of the DC/DC boost component.

4. The charging system according to claim 2, wherein the charging module further comprises an electricity meter; and a first terminal of the electricity meter is electrically connected to the second terminal of the inverter, and a second terminal of the electricity meter is electrically connected to the home grid.

5. The charging system according to claim 2, wherein the DC/DC boost component has one input or a plurality of inputs.

* * * * *